UNITED STATES PATENT OFFICE.

MAX CURT VON UNRUH, OF CHARLOTTENBURG, GERMANY, ASSIGNOR TO SAUERSTOFF- UND STICKSTOFF-INDUSTRIE HANSMANN & CO., OF VIENNA, AUSTRIA-HUNGARY, A FIRM.

OXIDATION OF METHANE.

No. 891,753.  Specification of Letters Patent.  Patented June 23, 1908.

Application filed October 29, 1907. Serial No. 399,763.

*To all whom it may concern:*

Be it known that I, MAX CURT VON UNRUH, doctor of philosophy, chemist, chief assistant at the Royal Technical University of Berlin, a citizen of the German Empire, residing in Charlottenburg, in the Kingdom of Prussia, German Empire, have invented certain new and useful Improvements in the Oxidation of Methane, of which the following is a specification.

This invention relates to an improved process of oxidizing methane by the catalizing action of certain contact-substances so as to form the higher oxidation-products, and separating the latter for use in the arts; and the invention consists in oxidizing methane or mixtures of gases containing a considerable amount of methane by subjecting it in presence of air or other gases containing oxygen to the action of specific vegetable products, acting as catalizing or contact-substances, such as bark, in such a manner that methyl alcohol and other products of the higher oxidation of methane are formed, without completely burning the hydrocarbon and changing it to carbon dioxid and water.

It is well known that methyl alcohol and formic aldehyde are obtained by the oxidation of methane by means of gases containing oxygen in the presence of copper, pumice stone, asbestos, or mixtures of these substances.

In the new process bark of any origin, such as oak bark used for tanning, or similar substances, such as bast, in small pieces or finely ground, are used as the catalizing or contact-substances. These contact-substances have the advantage of acting at a considerably lower temperature than the contact-substances which were used heretofore. Granulated copper, for instance, has been used at a temperature of about 600° centigrade; in the new process, however, temperatures of from 30 to 50° centigrade are preferably used. This means a considerable economy in fuel and a simplification of the apparatus employed. Furthermore, the contact-substances used in the new process can easily be obtained everywhere; in many places the bark is a waste product of very low value and may be procured at a very small cost.

In the new process natural gas is preferably used as the gas containing methane; this gas may be applied either in its natural state, or more or less refined. By natural gas is meant a gas which is obtained from the earth in certain places, and more especially in the neighborhood of oil fields. This gas contains about 95–98% of methane.

After the methane has been oxidized, the higher products of oxidation, that is to say, the mixture of methyl alcohol, formic aldehyde, and formic acid, or one or more of them, is conducted through vessels containing caustic lime, potash or the like; or the products are conducted through a column-apparatus for the purpose of binding the acids, such as formic acid, etc., and separating the oxidation-products which have different boiling points, by rectification.

Example 1. 12 liters of methane and 36 liters of oxygen, both well mixed and preliminarily heated up to 45.5° centigrade, are conducted slowly during a time of 12 hours through a reaction-vessel of 4 liters capacity, filled with oak bark in pieces of about 2 to 3 mm. diameter. The product is 1,520 g. of formic aldehyde, a small quantity of methyl alcohol and some formic acid.

Example 2. 24 liters of methane and 180 liters of air, both preliminarily heated up to 45° centigrade and well mixed, are conducted slowly during a time of 12 hours through a reaction-vessel of 4 liters capacity, filled with oak bark in pieces of about 2 to 3 mm. diameter. The products are 1,565 g. of formic aldehyde, a small quantity of methyl alcohol and some formic acid.

The temperatures for obtaining formic aldehyde are preferably from 43° up to 46.5° centigrade. For producing more methyl alcohol and less of the other products of oxidation, a somewhat lower temperature must be used; for the production of more formic acid and less of the other products of oxidation, the temperature must be somewhat higher.

Having thus described my invention, I claim as new and desire to secure by Letters Patent:

1. The process of oxidizing methane, which consists in subjecting methane in the presence of gases containing free oxygen to the catalizing action of bark at a temperature of from 30 to 50° C.

2. The process of oxidizing methane, which consists in subjecting natural gas in the presence of air to the catalizing action of bark at a temperature of from 30 to 50° C.

3. The process of oxidizing methane, which consists in subjecting methane in the presence of gases containing free oxygen to the catalizing action of bark at a temperature of from 30 to 50° C. so as to produce a mixture of methyl alcohol, formic aldehyde and formic acid.

4. The process of oxidizing methane, which consists in subjecting natural gas in the presence of air to the catalizing action of bark at a temperature of from 30° to 50° C., so as to produce a mixture of methyl alcohol, formic aldehyde and formic acid.

5. The process of oxidizing methane, which consists in subjecting methane in the presence of gases containing free oxygen to the catalizing action of bark at a temperature of from 30 to 50° C., and then separating the formic acid or other oxidation-product from the resulting mixture of methyl alcohol, formic aldehyde and formic acid.

In testimony, that I claim the foregoing as my invention, I have signed my name in presence of two subscribing witnesses.

MAX CURT VON UNRUH.

Witnesses:
HENRY HASPER,
WOLDEMAR HAUPT.